May 2, 1961  G. A. KOHOUT  2,982,236
PROGRESSIVE MATERIAL AGITATING DEVICE
Filed Jan. 28, 1957  8 Sheets-Sheet 3

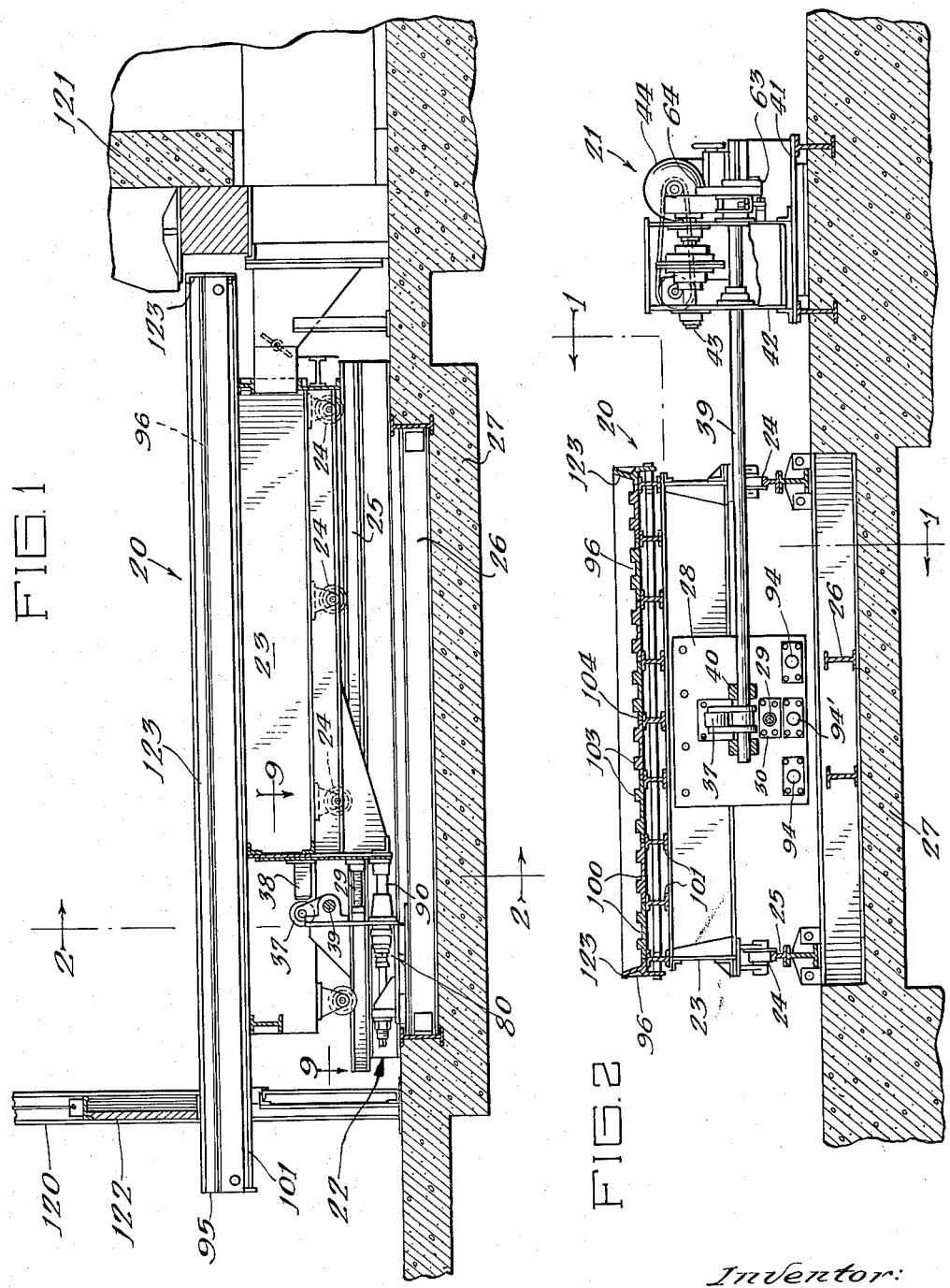

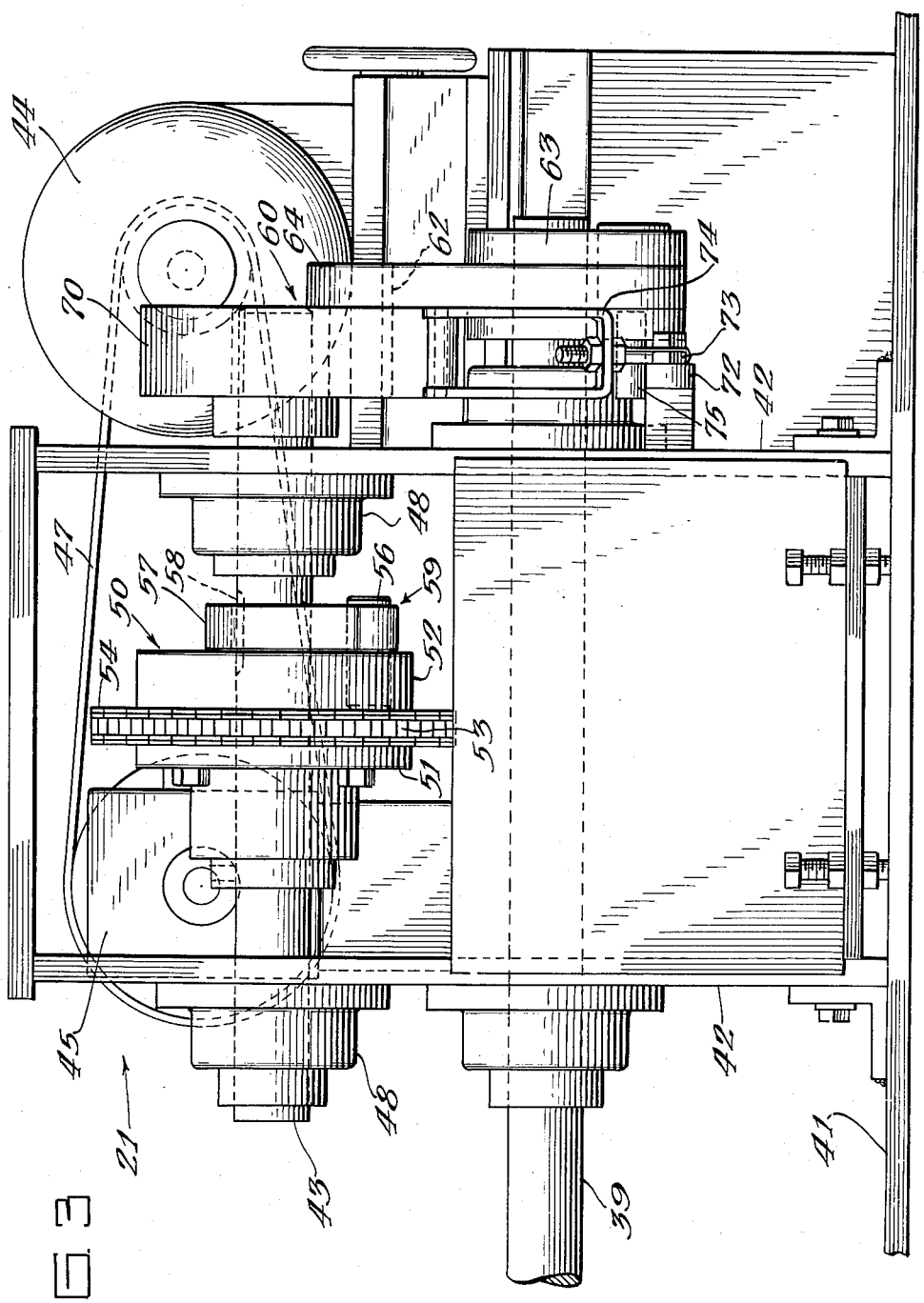

Inventor:
George A. Kohout
By: Zahl, Baker, York, Jones
and Dithmar
Attorneys

May 2, 1961 G. A. KOHOUT 2,982,236
PROGRESSIVE MATERIAL AGITATING DEVICE
Filed Jan. 28, 1957 8 Sheets-Sheet 4

Inventor:
George A. Kohout
By: Zabel, Baker, York,
Jours and Dithmar
Attorneys

May 2, 1961 G. A. KOHOUT 2,982,236
PROGRESSIVE MATERIAL AGITATING DEVICE
Filed Jan. 28, 1957 8 Sheets-Sheet 5
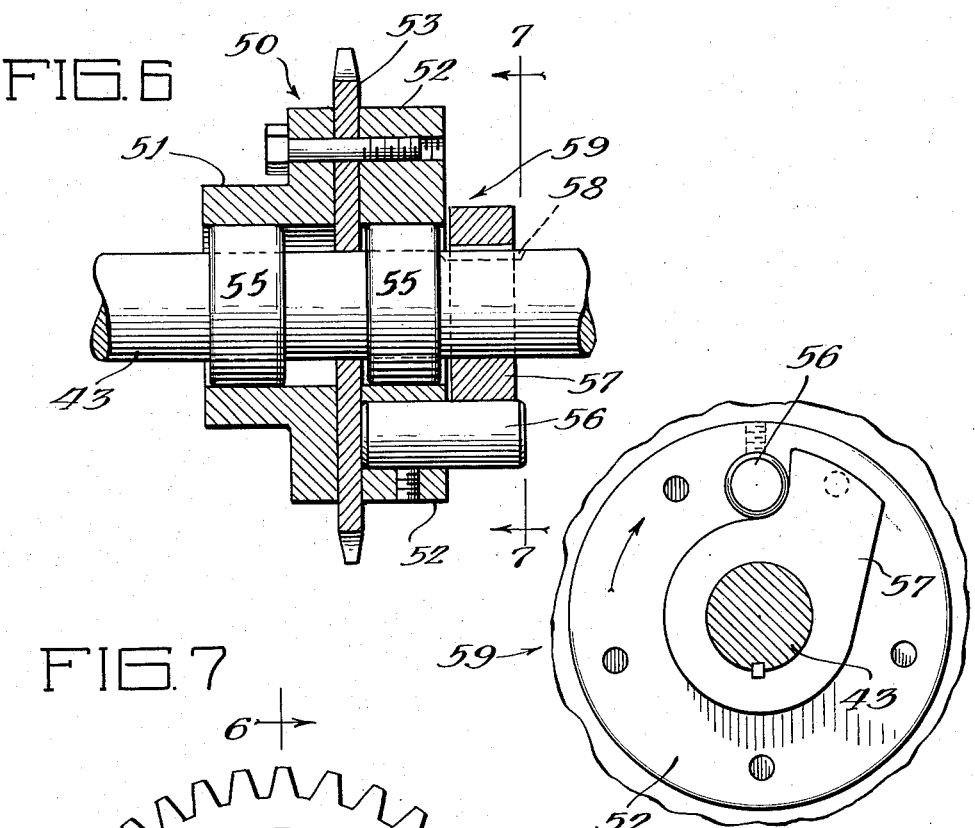
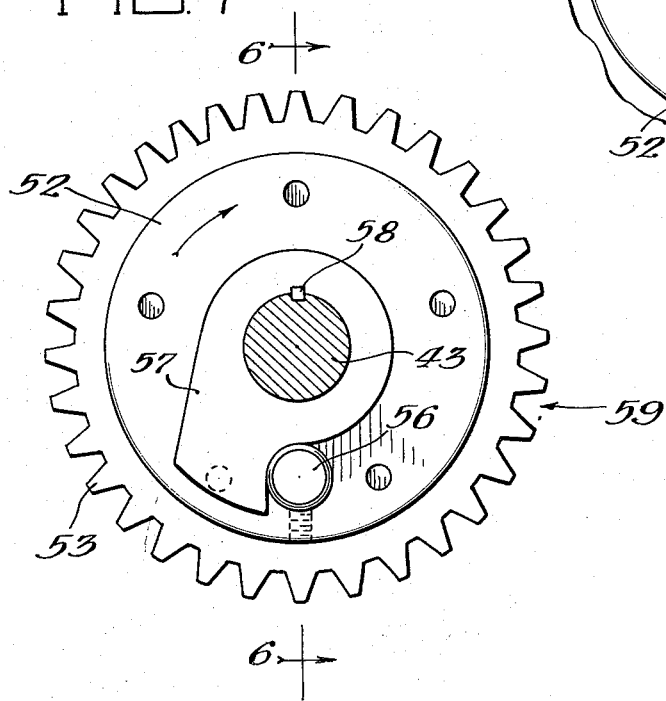
Inventor:
George A. Kohout
By: Zabel, Baker, York,
Jones and Dithmar
Attorneys

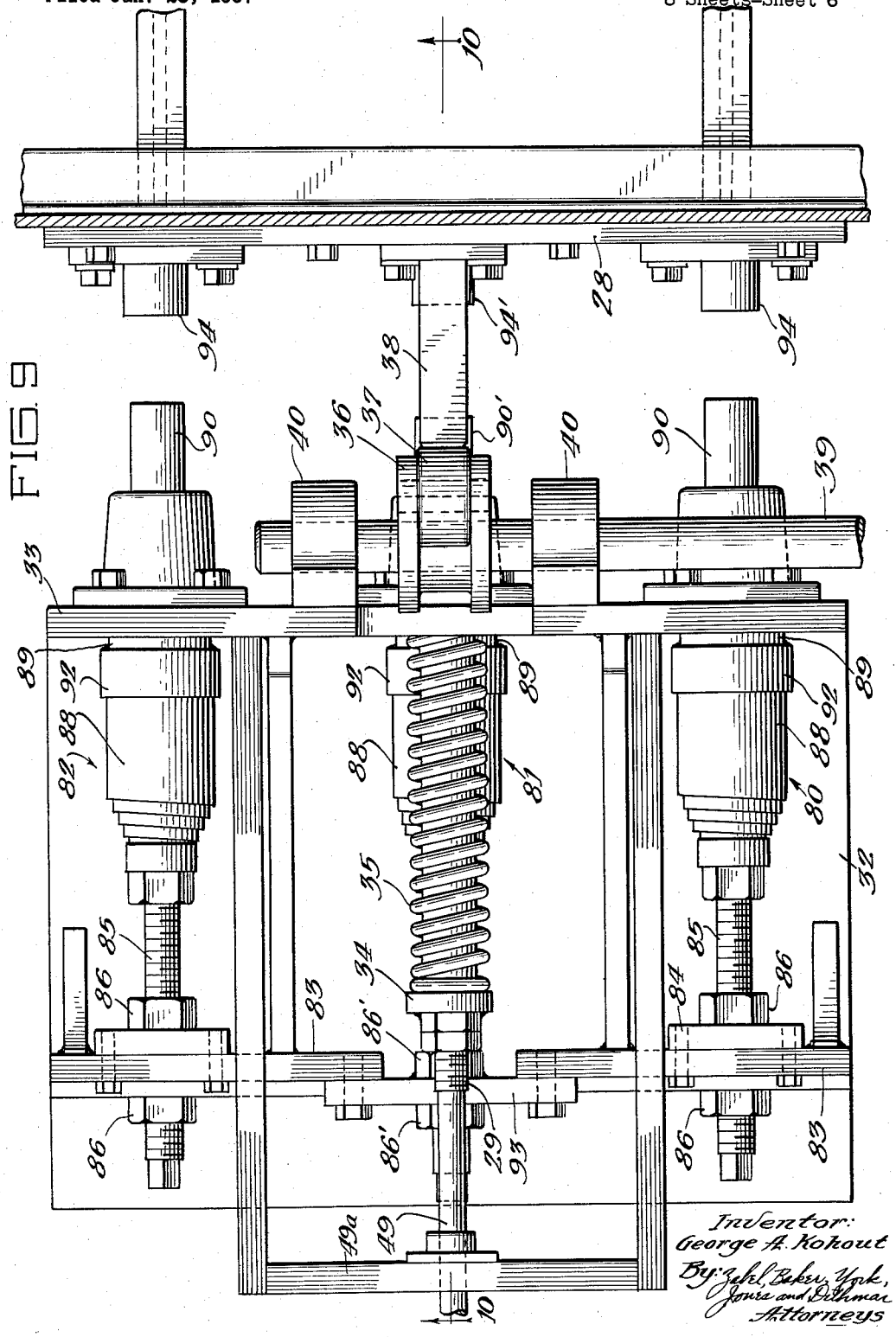

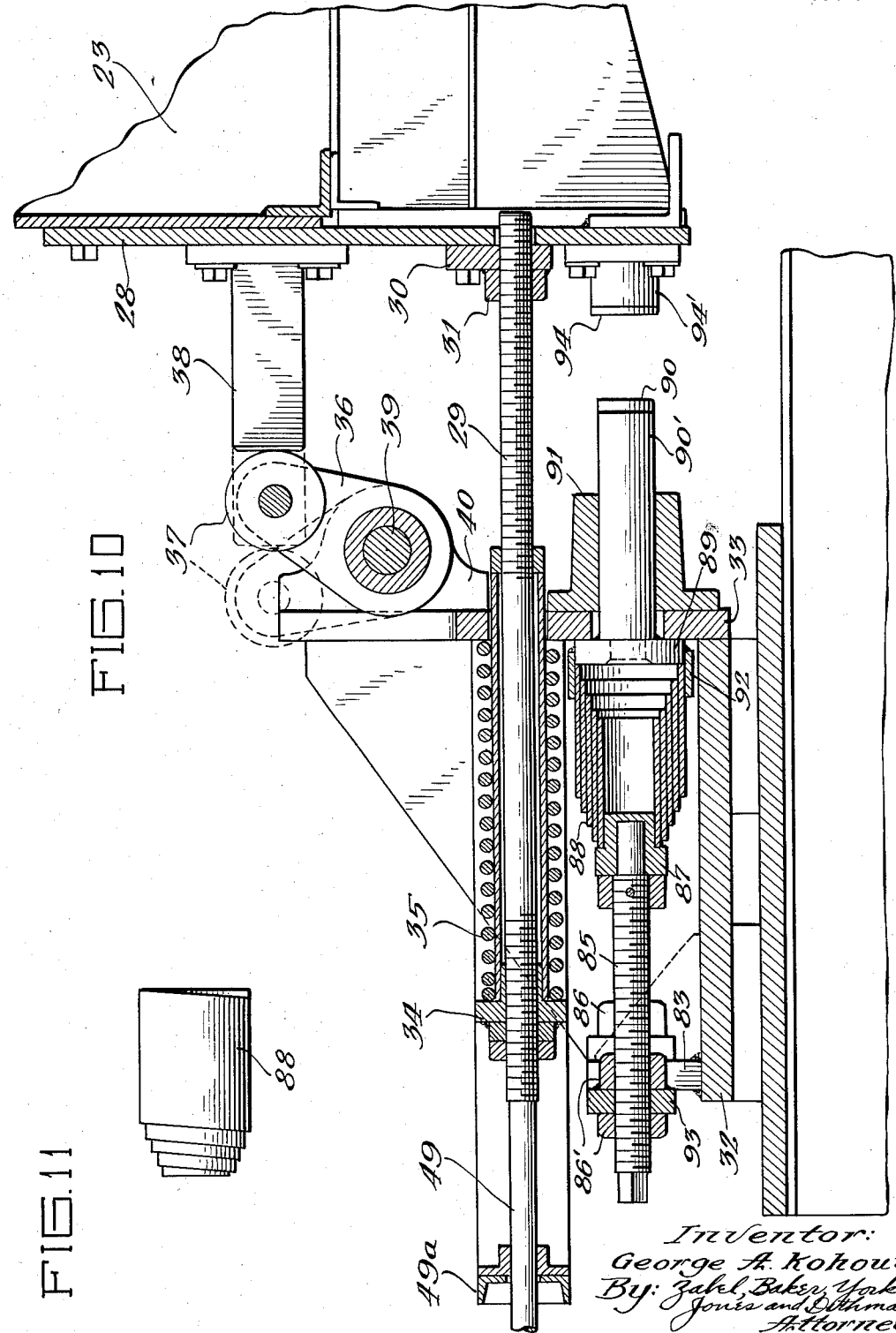

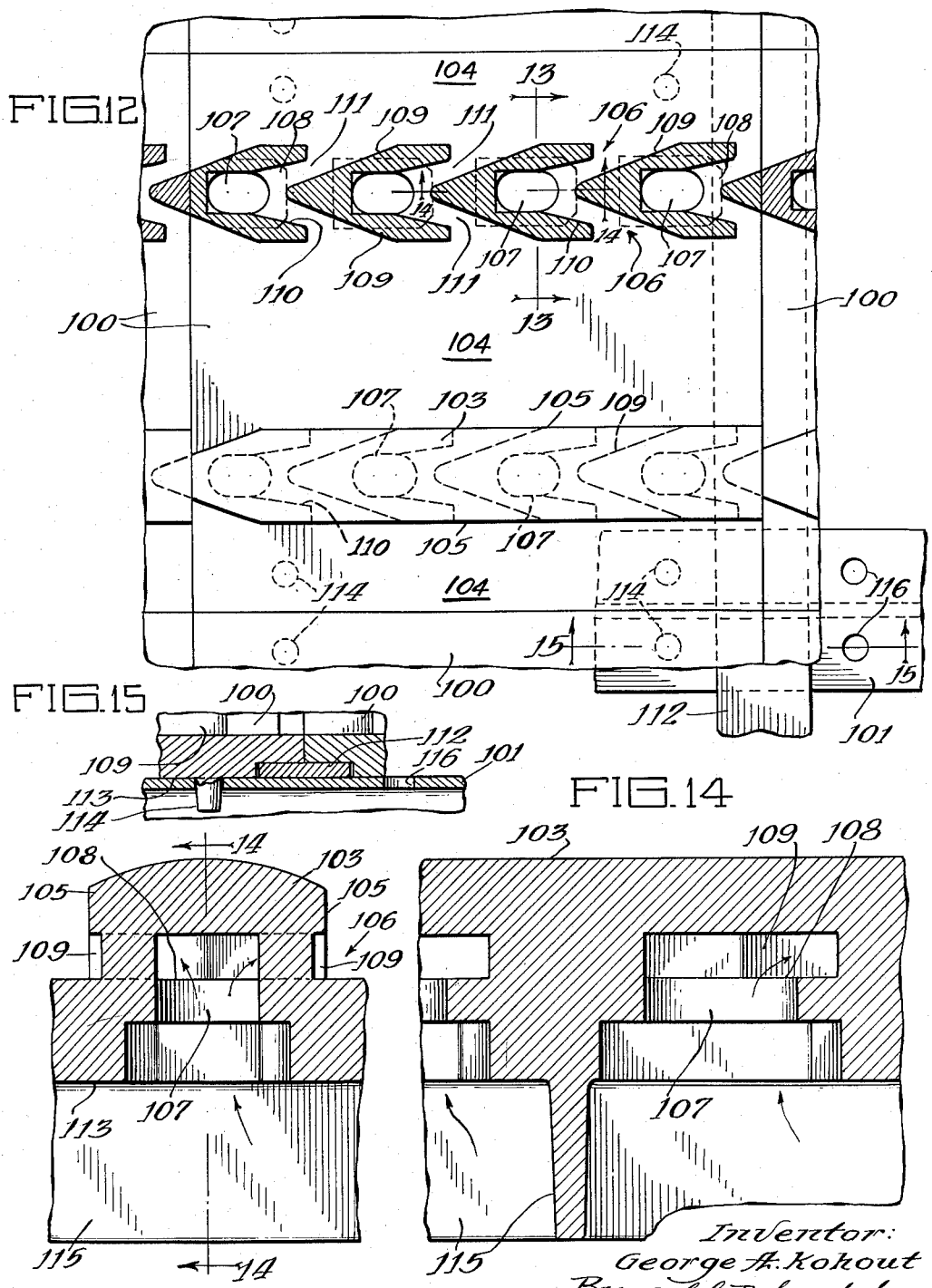

United States Patent Office 2,982,236
Patented May 2, 1961

2,982,236
PROGRESSIVE MATERIAL AGITATING DEVICE
George A. Kohout, 3530 Lake Shore Drive, Chicago, Ill.
Filed Jan. 28, 1957, Ser. No. 636,538
10 Claims. (Cl. 110—38)

This invention relates to improvements in progressive material agitating devices.

Such devices comprise a support in combination with means for driving the support in such a manner that the inertia of the load supported thereby causes the load material to move progressively from one end of the support to the other, and in such a manner that the abrupt movement of the support tends to break up agglomerations of the material supported and advanced thereby to the end that a high ratio of surface area to volume is maintained for the material of the load.

Thus, the device is useful in processes in which the material is being agitated and advanced, and is being simultaneously subjected to a processing operation in which comparatively large surface area is desired. Examples of such processing operations are: combustion, drying, distillation of oil shale, ore reduction, and sintering; although the invention is also applicable to various types of screening and conveying operations where an improved type of relative movement of the separate particles is desired.

One example of a device of this type is shown in my prior Patent No. 2,492,585, dated December 27, 1949, in which the device is incorporated in a stoker, the support constituting the fuel grate. In that patent, the driving means for the support or grate comprises a cam and a cooperating follower, the cam being provided with gradual rise surface and an abrupt drop surface to the end that the grate may be slowly retracted against the bias of a suitable spring, and suddenly projected by the force of the spring as the follower drops along the drop surface. Although such an arrangement is generally satisfactory for comparatively small stokers, and in situations where the power spring is relatively weak, it is obvious that the utility of such a drive mechanism is severely curtailed when applied to large installations which are designed to support a fuel bed of several tons. In other words, satisfactory operation of the device is dependent on utilization of the inertia of the fuel bed or material load, and this, in turn, calls for a power spring, the force of which is roughly proportional to the size of the load, and also to the degree of agitation which is desired. Experience has indicated that the mechanical difficulties in designing a simple cam and follower type of driving mechanism are almost insuperable, due largely to the large stress imposed upon the cam and to the sudden release thereof, which calls for extremely rugged parts and a heavy bearing for the cam shaft.

Furthermore, suitable stop means must be provided in order to utilize the inertia of the fuel bed or material load for progressively advancing, and agitating or breaking up the same. The stresses imposed upon such stop means increase disproportionately to the force of the spring and the abruptness of the drop surface with the result that the stop means must embody a certain amount of resilience or give in order to avoid fracture of the metal parts. Therefore, as the efficiency of the driving means is increased, the difficulties incident to the sudden stopping of the grate or other support, and the load carried thereby, increase disproportionately with the result that several difficulties have been encountered in designing a progressive material agitating device which is suitable for a larger installation.

According to my present invention, improved driving means has been provided which avoids the use of cam and follower mechanism, but which nevertheless is effective to release the power spring instantaneously without imposing such stress on the parts of the drive mechanism as will cause undue wear of the parts or such shock as will lead to rapid deterioration thereof.

It is therefore an object of my invention to provide a progressive material agitating device of the type indicated which embodies an improved drive mechanism.

It is another object of my invention to provide, in a device of the type indicated, improved stop means for cooperation with a drive mechanism which is suitable for operation under extremely heavy forces.

A further object is to provide in such device a stop means embodying a damping action in order to prevent mechanical interference of the parts due to rebound.

A still further object is to provide an improved agitating device in which the parts of the drive mechanism are so arranged that the reaction of the power spring is transmitted to the triggering or drop device in the form of a torque instead of a thrust, thus permitting the use of relatively light parts for the drop device, and permitting greater latitude in the location thereof from the viewpoint of accessibility.

My invention is shown and described herein as applied to a progressive material agitating device suitable for use in connection with one of the processing operations above mentioned, such as combustion, and thus the material support is provided with a plurality of tuyeres by means of which air or other gas may be supplied to the material of the load, instead of the usual grate with which most furnaces and incinerators are provided.

Still another object of my invention is to provide, in a device of the type described, an improved supporting structure for the fuel bed or other material to be processed, so that air or other gas may be supplied to the fuel bed at the supporting surface, and so that ash removal may be effected by the progressive action of the material support assembly.

A still further object is to provide a supporting structure in the form of separate tuyere plates which are constructed in such a manner that the ash or other fines will not clog the tuyeres, and in which the tuyeres are arranged in such a manner that the air jets provided thereby assist in the ash removal.

Other objects, features and advantages will become apparent as the description proceeds.

With reference now to the drawings in which like reference numerals designate like parts:

Fig. 1 is a longitudinal section taken along line 1—1 of Fig. 2 showing a prepared embodiment of my invention;

Fig. 2 is a transverse section taken along line 2—2 of Fig. 1;

Fig. 3 is a front elevation of the drive mechansim;

Fig. 6 is a sectional view of the sprocket assembly;

Fig. 7 is a side elevation thereof taken along line 7—7 of Fig. 6;

Fig. 8 is a view similar to Fig 7 but showing the parts in a changed position;

Fig. 9 is a plan view taken along line 9—9 of Fig. 1 showing the stop means;

Fig. 10 is a vertical longitudinal section taken along line 10—10 of Fig. 9;

Fig. 11 is a detail showing one of the volute spring elements in elevation;

Fig. 12 is a plan view partly in section showing one of the tuyere plates;

Fig. 13 is a transverse section taken along line 13—13 of Fig. 12;

Fig. 14 is a longitudinal section taken along line 14—14 of Fig 12; and

Fig. 15 is a longitudinal section taken along line 15—15 of Fig. 12.

Figure 4:
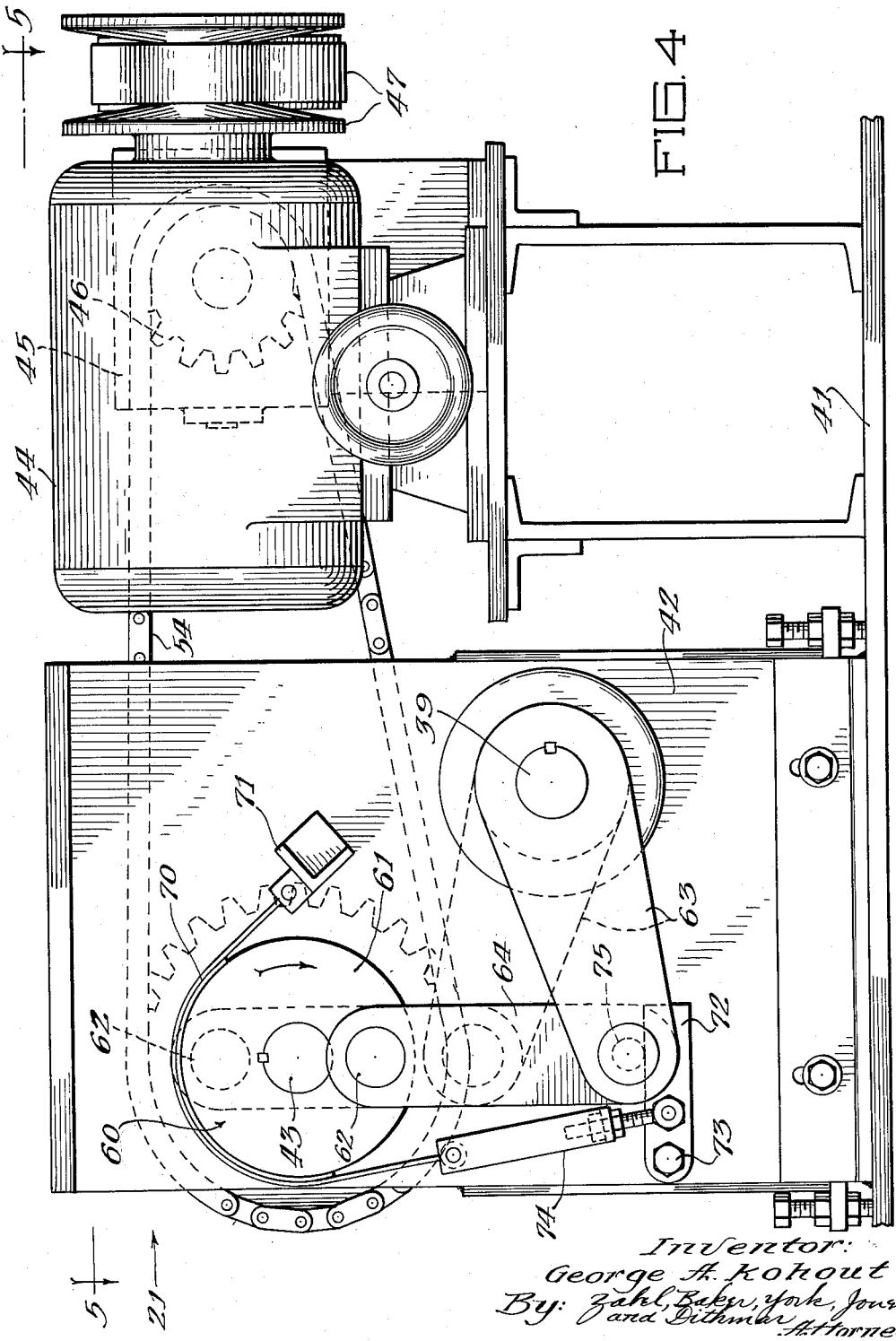
Fig. 4 is a side elevation thereof.

With reference now to Figs. 1 and 2, the progressive material agitating device comprises a material support assembly 20, drive mechanism 21, and a stop means assembly 22.

The material support assembly comprises a framework 23, which is mounted for reciprocating movement by means of wheels 24 on longitudinally extending rails 25. The rails in turn are firmly mounted on a suitable steel supporting structure 26, which is set into a concrete foundation 27. Thus, material support 20 may be moved back and forth in a longitudinal direction by means of the drive mechanism 21 and a power spring 35 (Figs. 9 and 10).

The material support 20 includes a vertical plate 28 which is suitably secured to the framework 23 as shown in Figs. 9 and 10. A tension rod 29 projects forwardly from the vertical plate 28 and is secured thereto by means of a suitable thrust plate 30 and a locknut 31. The power spring 35 surrounds the tension rod 29 and serves to urge the material support assembly 20 forwardly with a very heavy force.

The stop means assembly 22 includes a base plate 32 which is suitably anchored to the support structure 26, and it also includes a vertical mounting plate 33. The tension rod 29 is provided, towards its front end with a head 34 so that the power spring 35 may be confined between the head 34 and the mounting plate 33. As shown in Figs. 9 and 10, the major portion of the tension rod is preferably threaded so as to provide adjustable engagement with the thrust plate 30 and locknut 31 at its rear end, and with the head 34 and an associated locknut at its front end. The extended portion 49 of the tension rod 29 passes through a suitable cross member 49a of the stop means assembly 22 and serves as a pilot to maintain the tension rod 29 in proper alignment. Thus, the very substantial force of the power spring 35 is applied to the reciprocating material support assembly 20.

Means are provided to displace the material support assembly rearwardly against the bias of the power spring 35, and such means comprise an oscillating yoke 36 which carries a roller 37 which in turn engages a thrust block 38 which extends forwardly from the vertical plate 28 as shown in Figs. 9 and 10. The oscillating yoke is secured to and forms a part of a rock shaft 39 which is journalled in trunnions 40 which are secured to the mounting plate 33. Thus oscillation of the yoke 36 causes reciprocation of the material support assembly 20.

The drive mechanism 21 not only imparts oscillatory rotation to the rock shaft 39, but also provides a triggering or drop action which permits sudden release of the power represented by the compression of the power spring 35, in order to utilize the inertia of the material support assembly 20 and the load supported thereby to agitate or break up the material of the load when the forward movement thereof is abruptly interrupted. To this end, the drive mechanism includes an overrunning clutch 59 which utilizes the over-center action of a crank 60 to provide the desired drop action.

Figure 5:
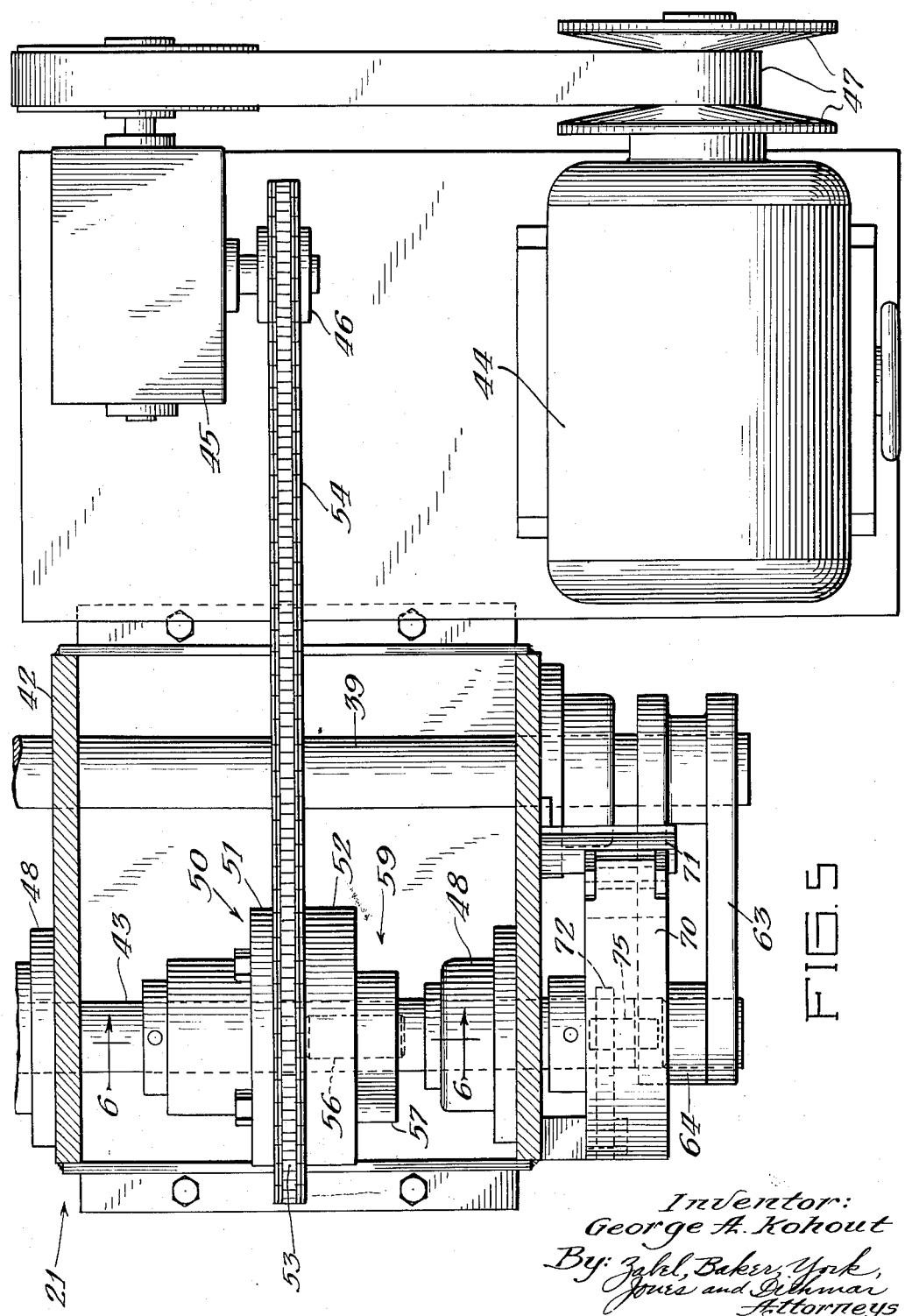
Fig. 5 is a plan section taken along line 5—5 of Fig. 4.

The structure of the drive mechanism which is shown in Figs. 3 to 5 includes a base plate 41 which is suitably anchored to the foundation 27, as shown in Fig. 2, together with side plates 42. A drive shaft 43 is suitably journalled in the side plates 42 by means of roller bearing units 48. Power means for driving the drive shaft 43 include a motor 44, a speed reducing gearbox 45 which includes an output socket 46, and a variable speed belt and pulley device 47 which connects the motor and the gearbox.

Rotatably mounted on the drive shaft 43 is a sprocket assembly 50, shown in Fig. 6 which includes hub members 51 and 52 and an intermediate sprocket 53 which is suitably bolted thereto. The hub members are rotatably mounted on the drive shaft 43 by means of suitable ball or roller bearing units 55. A sprocket chain 54 extends between the sprockets 46 and 53 for driving the sprocket assembly 50.

The overrunning clutch 59 is preferably of the pin and dog type since only 180 degrees of overrun is required, and since a pin and dog type of clutch provides positive operation and simplicity of construction as compared with other types of overrunning clutch such as a jaw type or ball type. The drive member of the clutch 59 comprises the sprocket assembly 50 and a pin 56 which is suitably anchored in the hub member 52 and projects from the side surface thereof as shown in Fig. 6. The driven member comprises the drive shaft 43 together with a dog 57 which is keyed thereto at 58. The pin 56 drives the dog 57 to cause rotation of the drive shaft 43, but the driven element is nevertheless free to overrun the pin 56 for almost 360 degrees. As hereinafter pointed out, the pin 56 drives the dog 57 through approximately 180 degrees, from the normal dog position shown in Fig. 7 to the displaced dog position shown in Fig. 8, after which the power spring 35 causes the dog 57 to overrun the pin as it moves back into its normal position. The displaced, or Fig. 8, position therefore represents the over-center or triggering position of the parts.

The drive shaft 43 is connected to the rock shaft through a crank and rocker mechanism which provides the over-center or triggering action. As shown in Fig. 4 the crank 60 is in the form of a drum 61, having an eccentric pin 62 projecting from the side surface thereof and is suitably keyed to the drive shaft 43. A rocker arm 63 is suitably keyed to the rock shaft 39. A link 64 connects the pin 62 and the rocker arm 63, the arm radius being greater than the eccentricity of the pin so that complete rotation of the drive shaft 43 will cause oscillation of the rock shaft 39.

In Fig. 10, the displaced position of the parts is shown in solid lines, and the normal position of roller 37 is shown in dotted lines, whereas in Fig. 4, the displaced position of the rocker arm 63 is shown in dotted lines, and its normal position is shown in solid lines. In operation, as soon as the crank 60 passes through its over-center position, then the full force of the power spring 35 causes the rocker arm 63, and hence the dog 57, to rotate in advance of pin 56 downwardly into its normal position, shown in solid lines in Fig. 4.

Means are provided to prevent oscillation of the crank 60 as it reaches the bottom of its stroke and until such time as the dog 57 is again picked up by the pin 56. Such means comprises a generally flexible brake band 70 which cooperates with the periphery of the drum 61. One end of the brake band is secured to a fixed anchor 71 as shown in Fig. 4, and the other end is connected to an actuating arm 72 which is pivotally mounted at 73 on one of the side plates 42. The connection between the brake band 70 and the actuating arm 72 is made through a suitable adjusting yoke and swivel pin assembly 74 so that the tension of the brake band may be regulated. The pin which connects the link 64 to the arm 63 is provided with an extended portion 75 which engages the actuating arm 72 to actuate the brake as the arm and link 63 and 64 move into their normal or solid line position, as shown in Fig. 4. Thus oscillation of the crank 60 is prevented, although the braking action is not so strong as to prevent rotation of the crank 60 when the dog 57 is again picked up by the pin 56. Upon subsequent rotation of the dog 57 and portion 75 through a few degrees, the actuating arm 72 and the brake band 70 will be released.

As indicated above, the material support assembly is brought to a sudden stop by means of the stop means assembly 22 which is so designed as to absorb the stress imposed thereon without causing fracture of the parts, and at the same time to provide a damping or snubbing action which will cooperate with the brake 70 to prevent mechanical interference of the oscillating yoke roller 37 with the thrust block 38. In other words, oscillating movement of the former is avoided by the brake means described above, and of the latter by the stop means hereinafter described.

The stop means assembly includes three separate damping assemblies designated generally by the reference numerals 80, 81 and 82 as shown in Figs. 9 and 10. Since the parts of all three assemblies are substantially identical, the same reference numerals will be used for the corresponding parts of each. As shown in Fig. 9, a support plate 83 is suitably welded to the base plate 32 and is provided with a bushing 84 in which a threaded support rod 85 is secured by means of nuts 86. The support rod 85 is provided with a head 87 which engages the edge of the innermost convolution of a volute spring 88, the head also having a projected center portion which is received within the innermost convolution and to support the front end of the volute spring.

The rear end of the volute spring 88 is engaged by a head 89 which is carried on at the front end of a stop plunger 90. The latter is slidably mounted in a bushing 91 which is secured to the rear face of the vertical mounting plate 33. The head 89 is provided with a collar 92 which serves to confine the volute spring 88 in its coiled position.

With respect to the middle damping assembly 81, the front end of its support rod 85 is supported in a bridge plate 93 which is secured to the support plates 83 at either side thereof. The stop plunger for this middle damping assembly is designated by the reference numeral 90'.

Suitably mounted on, and projecting forwardly from vertical plate 28 of the material support assembly 20 are two stop blocks 94 which are adapted to engage the two stop plungers 90, and a middle stop block 94' which is adapted to engage the middle stop plunger 90'. The extent of projection of the stop plungers 90 and 90' can be regulated by the nuts 86 and 86' and is preferably regulated so that the outer stop plungers 90 will be engaged simultaneously with each other prior to engagement of the stop plunger 90'. In other words, the two outer damping assemblies 80 and 82 are designed to absorb the full load, and the middle damping assembly 81 can be utilized to provide an additional stage of damping action right before the very end of the stroke. Thus the material support assembly is abruptly stopped, and the damping action can be suitably regulated by the nuts 86 and 86' so as to avoid any rebound. The volute springs 88 are of the same general type as that described in Wolff et al. Patent No. 2,649,298, granted August 18, 1953.

The driving mechanism causes retraction of the material support assembly 20, and then sudden release thereof, and the forward motion is abruptly interrupted by the stop means assembly 22. The forward motion of the material support assembly is imparted to the load supported thereby with the result that the inertia of the load tends to cause it to move forwardly after the motion of the grate has been interrupted. However, the forward motion is so abrupt that it is more in the nature of an impulse which tends to rearrange the particles of the material of the load, or otherwise break up any agglomeration of said particles. This is particularly important in the case of processing operations involving combustion and sintering since it tends to prevent fusing of the particles; instead, a high ratio of surface area to volume is maintained. This breaking up action is accentuated by the relative movement of the load with respect to the material support assembly 20 after the abrupt stopping of the latter.

As applied to incineration and other types of combustion, the present device provides a longitudinal zoning of the fuel bed in which the ash is advanced forwardly and discharged over the front edge 95 of the material support surface 96. Therefore, instead of the usual grate I provide a nonsifting supporting surface which is designed to serve the dual function of promoting the forward movement of the ash and of supplying air to the fuel bed.

According to this aspect of my invention, the material supporting surface 96 comprises a plurality of tuyere plates 100, each of which provides one or more tuyeres 106 which are oriented in a horizontal direction so that the particles of the fuel bed or other load will not drop into the tuyeres and clog the same.

As shown in Figs. 1 and 2, the tuyere plates 100, which are of generally rectangular shape, rest upon longitudinal I-beams 101 which form a part of the framework 23. Thus the tuyere plates, which are of generally rectangular shape, may be arranged in edge to edge engagement to provide a continuous material supporting surface 96.

As shown in Figs. 12 to 14, each tuyere plate 100 is provided with two ridges 103 which are separated by channels 104. The ridges 103 are provided with side edges 105 in which the tuyeres 106 are formed. Each tuyere or passageway comprises a vertical portion 107, and a horizontal portion 108, these two portions being in communication with each other, and together providing communication between the underside of the material support assembly 20 and the channels 104. The fact that the tuyeres terminate in a horizontal passageway portions 108 not only prevents sifting but also prevents clogging of the tuyeres 106.

The horizontal portions 108 are oriented in a generally forwardly direction as shown in Fig. 12 so that the air blast or jet will be directly forwardly and tend to move forwardly the ash or other fines which become separated from the main mass of the load and settle into the channels 104. In other words, the forwardly directed jet action tends to compensate for the smaller inertia of these fine particles to the end that the ash and fines may be advanced toward the discharge and at substantially the same rate of speed as the more massive particles of the load.

As shown in Fig. 12, the horizontal passageway portion 108 is provided with side walls 109 and 110 which are tapering or convergent to provide a throat 111 which serves to increase the velocity of the jet. It is intended that air or other gas be forced or drawn through the tuyeres 106 with sufficient velocity as to prevent any counter-flow of solids into the tuyeres. Furthermore, the forwardly sloping side walls 109 tend to displace the particles laterally into the channel with the result that there is no downward sifting of ash and other fines as is the case with the usual grate.

The longitudinal joints between the tuyere plates are underlain by the I-beam 101 and the transverse joints by suitable metal strips 112 which rest on the I-beams 101 in order to prevent sifting at the joints. The bottom surface 113 of the tuyere plate which rests on the I-beams may be cut away to accommodate the strips 112.

The non-sifting supporting surface herein shown can thus be readily made up by a number of like tuyere plates 100, which are preferably in the form of iron castings. The construction shown provides a simple and effective means of assuring uniform distribution of air or other gas to the fuel bed or other load, and it is contemplated that either the area below the supporting surface 96 or above the same or both be suitably enclosed so as to provide the pressure differential desired for the air jets. However, in some instances it may be desired to substitute imperforate plates toward the front end of the material supporting surface 96 so that the air supply can be confined to the remaining portion thereof.

The tuyere plates 100 are secured to the I-beams 101 by means of suitable pins 114, which fit into corresponding apertures 116 in the flanges of the I-beams 101. Also, the central portions of the tuyere plates may be provided with suitable reinforcing and heat radiating ribs 115, if desired, as indicated in Figs. 13 and 14.

When enclosed, the complete installation will include front walls 120 and rear wall 121, as shown in Fig. 1, and suitable side wall not shown. A vertically sliding front discharge gate 122 may be provided so that the dimensions of the discharge port can be regulated, as shown in Fig. 1. Also, the supporting surface 96 may be provided with suitable side and rear rims 123 which serve to keep the ash from sifting over the side edges.

To summarize the operation, which has been set forth in detail in connection with the description of the various parts and sub-assemblies, the motor 44 rotates the drive shaft 43 through the sprocket assembly 50 and the pin and dog overrunning clutch 59. The crank and rocker mechanism causes forward and backward rotation of the rock shaft 39 and consequent reciprocation of the material support assembly 20. This reciprocating movement comprises a slow retraction and a very sudden forward impulse which serves to agitate and advance the load material. The damping assemblies 80, 81 and 82 serve to stop abruptly the material support assembly 20 so that the inertia of the load material will cause advance of the same toward the forward edge 95 of the material support 96, over which the material may be discharged into a suitable hopper, conveyor belt or the like.

The supporting surface 96 provides a plurality of tuyeres 106 through which air or other gas may be supplied so that the load may be subjected to a processing operation during its advance from one end of the supporting surface to the other. It is contemplated that the material be loaded on to the supported surface 96 at the rear thereof, through a suitable charging port.

In the case of certain continuous processing operations such as combustion and incineration of refuse, the tuyeres 106 provide forwardly projected air jets which are effective in displacing the ash and other fines toward the discharge gate 122.

The tuyere plate construction shown is also useful in drying processes, ore reduction and sintering, distillation of oil shale, and the like. For sifting and screening operation, a suitable screen may be substituted for the tuyere plates shown, and the simultaneous and agitating advance of the material to be sifted has been found to provide a very effective continuous process.

The throw of the material support assembly may be regulated within fine limits by adjustment of the adjusting nuts 86, and within coarse limits by substitution of the crank 60 for another of different eccentricity.

Similarly, the frequency of the impulses provided may be regulated by the variable speed device 47, and the force of the power spring can be regulated by adjustment of the head 34.

As an example of the quantities involved, when used for incineration, the material support assembly can be designed for a load of 5 tons, and the power spring 35 may have a deflection of 1000 pounds per inch, designed to exert a force of 6000 pounds when the parts are in displaced position.

Although only a preferred embodiment of my invention has been shown and described herein, it will be apparent that various modifications and changes may be made in the construction shown herein without departing from the spirit of my invention as pointed out in the appended claims.

I claim:

1. A progressive material agitating device comprising a base, a material support assembly mounted on said base for reciprocating movement, a power spring urging said material support assembly forwardly, drive means for displacing said material support assembly rearwardly against the bias of said power spring and including over-center means for releasing said power spring and an overrunning clutch associated with said over-center means to permit said power spring to move said material support assembly in advance of said drive means, a drum driven from said overrunning clutch, brake means engaging said drum and operable by the movement of said over-center means for preventing oscillation of said over-center means when said power spring is released, and stop means engaged by said material support assembly to define the limit of its motion in the forward direction.

2. A progressive material agitating device comprising a material support assembly, a power spring urging the same forwardly, drive means for displacing said material support assembly rearwardly against the bias of said power spring, said drive means including a continuously rotating drive element, a crank driven thereby, means connecting said crank and said material support assembly whereby an over-center action is provided, and an overrunning clutch disposed between said continuously rotating drive element and said crank whereby said over-center action is utilized to release the force represented by the compression of said spring, thereby permitting said power spring to move said material support assembly forwardly, brake means engaging said crank and operable at the bottom of the stroke of said crank for preventing oscillation of said crank after it reaches the bottom of its stroke, and stop means engaged by said material support assembly to define the limit of its motion in the forward direction whereby the inertia of the material of a load supported on said material support assembly will cause the same to advance in a forwardly direction with respect to said material support assembly, and whereby the abruptness of the stop provided by said stop means will cause agitation of the material of the load.

3. A progressive material agitating device comprising a material support assembly, a power spring urging the same forwardly, drive means for displacing said material support assembly rearwardly against the bias of said power spring, said drive means including a continuously rotating drive element, a crank driven thereby, means connecting said crank and said material support assembly whereby an over-center action is provided, and an overrunning clutch disposed between said continuously rotating drive element and said crank whereby said over-center action is utilized to release the force represented by the compression of said spring, thereby permitting said power spring to move said material support assembly forwardly, stop means engaged by said material support assembly to define the limit of its motion in the forward direction whereby the inertia of the material of a load supported on said material support assembly will cause the same to advance in a forwardly direction with respect to said material support assembly, and whereby the abruptness of the stop provided by said stop means will cause agitation of the material of the load, a thrust block mounted on said material support assembly, an oscillating yoke mounted adjacent to said thrust block and supporting a roller for engaging said thrust block, said oscillating yoke being driven by said drive means, and brake means engaging said crank and operable at the bottom of the stroke of said crank for preventing oscillation of said crank as it reaches the bottom of its stroke, said stop means comprising a volute spring for preventing rebound of said material support assembly when it engages said stop means whereby said thrust block will be continuously maintained in engagement with said roller as said material support assembly moves forwardly.

4. In a progressive material agitating device, including a rock shaft for actuating the material support assembly thereof, the combination of drive mechanism for rotating said rock shaft in one direction and comprising a continuously rotating drive element, a driven element coaxially mounted with respect to said drive element, an overrunning clutch providing a driving connection between said drive and driven elements whereby said driven element may overrun said drive element, a crank connected to said driven element, and means connecting said crank and said rock shaft, spring means for rotating said rock shaft in the opposite direction whereby said overrunning clutch utilizes the over-center action provided by said crank to permit said driven element to overrun said drive element by virtue of the force exerted by said spring means, brake means for engaging said driven element for preventing oscillation thereof at the bottom of the stroke of said crank, and brake actuating means operable by the movement of said driven element as it moves into its normal position corresponding to the bottom of the stroke of said crank.

5. Actuating means for crank and rocker mechanism comprising a continuously rotating drive element, a driven element coaxially mounted with respect to said drive element, an overrunning clutch providing a driving connection between said drive and driven elements whereby said driven element may overrun said drive element, a crank connected to said driven element, a rocker arm, a link connecting said crank and said rocker arm, a spring biasing said rocker arm into a given normal position whereby said overrunning clutch utilizes the over-center action provided by said crank and link to permit said driven element to overrun said drive element by virtue of the force exerted by said spring, brake means for engaging said driven element for preventing oscillation thereof at the bottom of the stroke of said crank, and brake actuating means engaged by said rocker arm as it moves into its normal position corresponding to the bottom of the stroke of said crank.

6. Actuating means as claimed in claim 5 in which said overrunning clutch comprises a pin and dog type of clutch.

7. Actuating means as claimed in claim 6 in which said pin and dog clutch comprises a pin mounted in and projecting laterally from said drive element and a dog secured to and projecting radially from said driven element for engagement by said pin.

8. Stop means for a progressive material agitating device which includes a material support assembly, a power spring urging the same forwardly, drive means for displacing said material support assembly rearwardly against the bias of said power spring, and a base, said stop means comprising a vertical support plate and a vertical mounting plate longitudinally spaced from each other on said base, a support rod mounted at its forward end in said vertical support plate, a plunger slidably mounted in said vertical mounting plate, a head for the rear end of said support rod, a head for the front end of said plunger, a volute spring disposed between said heads and operably supported thereby, and means on said material support assembly for engaging said plunger whereby the force of said power spring will be absorbed and dampened by compression of said volute spring as said plunger is engaged by said material support assembly.

9. A progressive material agitating and processing device suitable for garbage incineration comprising a horizontal material support assembly, a power spring urging the same forwardly, drive means for displacing said material support assembly rearwardly against the bias of said power spring and for releasing the force represented by the compression of said spring, thereby permitting said power spring to move said material support assembly forwardly, and stop means engaged by said material support assembly to define the limit of its motion in the forward direction whereby the inertia of the material of a load supported on said material support assembly will cause the same to advance in a forwardly direction with respect to said material support assembly, and whereby the abruptness of the stop provided by said stop means will cause agitation of the material of the load, and passageways formed in said material support assembly which are directed in a forward direction for supplying a gas to the material of said load, the outlets of said passageways being horizontally disposed to prevent downward sifting of the material of said load through said passageways, said material support assembly being located above said power spring and stop means and extending forwardly thereover so as to provide a continuous horizontal surface for the reception of the material to be processed and to permit progressive movement thereof in a forward direction at a point above said power spring and stop means so that the material after processing may be discharged over the front edge of the material support at a point forwardly of said power spring and stop means.

10. A progressive material agitating and processing device as claimed in claim 9 in which said drive means includes a continuously rotating drive element, a crank driven thereby, means connecting said crank and said material support assembly whereby an over-center action is provided, an overrunning clutch disposed between said continuously rotating drive element and said crank whereby said over-center action is utilized to cause said release of the force represented by the compression of said spring, and brake means engaging said crank and operable at the bottom of the stroke of said crank for preventing oscillation of said crank as it reaches the bottom of its stroke.

References Cited in the file of this patent

UNITED STATES PATENTS

| Number | Name | Date |
| --- | --- | --- |
| 1,140,158 | Hopes | May 18, 1915 |
| 1,326,197 | Hopwood | Dec. 30, 1919 |
| 1,585,967 | Eilers et al. | May 25, 1926 |
| 1,925,840 | Marx | July 23, 1931 |
| 1,840,117 | Losch | Jan. 5, 1932 |
| 2,197,428 | Erb | Apr. 16, 1940 |
| 2,380,452 | Kohout | July 31, 1945 |
| 2,492,585 | Kohout | Dec. 27, 1949 |

FOREIGN PATENTS

| Number | Country | Date |
| --- | --- | --- |
| 334,288 | Germany | Mar. 12, 1921 |